(12) United States Patent
Kim et al.

(10) Patent No.: US 11,371,604 B2
(45) Date of Patent: Jun. 28, 2022

(54) HYDRAULIC PRESSURE SUPPLY SYSTEM OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Hyunsuk Kim, Seoul (KR); Youngjoon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 171 days.

(21) Appl. No.: 16/852,784

(22) Filed: Apr. 20, 2020

(65) Prior Publication Data
US 2021/0207708 A1    Jul. 8, 2021

(30) Foreign Application Priority Data
Jan. 8, 2020    (KR) .......................... 10-2020-0002684

(51) Int. Cl.
*F16H 61/02*    (2006.01)
*F16H 61/00*    (2006.01)
(Continued)

(52) U.S. Cl.
CPC ......... *F16H 61/0267* (2013.01); *F04B 23/08* (2013.01); *F16H 57/0439* (2013.01);
(Continued)

(58) Field of Classification Search
CPC ............ F16H 61/0267; F16H 61/0009; F16H 61/0025; F16H 61/0206; F16H 61/0265;
(Continued)

(56) References Cited

U.S. PATENT DOCUMENTS 10,473,126 B2 * 11/2019 Harada ................. F15B 11/165
2012/0085441 A1 * 4/2012 Park ..................... F16H 61/0025
137/565.11

(Continued)

FOREIGN PATENT DOCUMENTS

JP    6190858 B2    8/2017
JP    6427471 B2    11/2018

*Primary Examiner* — Atif H Chaudry
(74) *Attorney, Agent, or Firm* — Lempia Summerfield Katz LLC

(57) ABSTRACT

A hydraulic pressure supply system of an automatic transmission includes: a first hydraulic pump forming a first hydraulic pressure from a hydraulic fluid stored in an oil pan; a second hydraulic pump pressurizing a received hydraulic pressure to a higher pressure, where the received hydraulic pressure may be received from the first hydraulic pump and from the oil pan; a regulator valve which is disposed at an upstream side of a low pressure portion and regulates hydraulic pressures supplied from the first and second hydraulic pumps so as to supply the regulated pressure to the low pressure portion; and a plurality of hydraulic lines that supplies the hydraulic pressure of the first hydraulic pump to the regulator valve and a high pressure portion and supplies the hydraulic pressure of the second hydraulic pump to the high pressure portion and the regulator valve.

3 Claims, 4 Drawing Sheets

(51) Int. Cl.
*F16H 57/04* (2010.01)
*F04B 23/08* (2006.01)

(52) U.S. Cl.
CPC ..... *F16H 57/0441* (2013.01); *F16H 61/0009* (2013.01); *F16H 61/0021* (2013.01); *F16H 61/0031* (2013.01); *F16H 2061/0037* (2013.01); *Y10T 137/86139* (2015.04)

(58) Field of Classification Search
CPC ............. F16H 61/0276; F16H 61/0031; F16H 57/0441; F16H 2061/0037; F16H 61/0021; F16H 57/0439; F04B 23/08; Y10T 137/86139
See application file for complete search history.

(56) References Cited

U.S. PATENT DOCUMENTS

| | | | | |
|---|---|---|---|---|
| 2014/0064990 | A1* | 3/2014 | Jo ....................... | F16H 61/0031 417/253 |
| 2015/0316144 | A1* | 11/2015 | Yoshitani ............ | F16H 57/0441 475/31 |

* cited by examiner

HYDRAULIC PRESSURE SUPPLY SYSTEM OF AUTOMATIC TRANSMISSION FOR VEHICLE

CROSS-REFERENCE TO RELATED APPLICATION

This application claims priority to and the benefit of Korean Patent Application No. 10-2020-0002684, filed on Jan. 8, 2020, the entire contents of which are incorporated herein by reference.

FIELD

The present disclosure relates to a hydraulic pressure supply system of an automatic transmission for a vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

Particularly, improvement of fuel consumption in transmission can be achieved through improvement of power delivery efficiency, and improvement of power delivery efficiency can be achieved by minimizing unnecessary consumption power of hydraulic pump.

For improvement of fuel consumption, first and second hydraulic pumps may be separately employed in an automatic transmission such that a hydraulic pressure generated at the first hydraulic pump is supplied to low pressure portions (torque converter, cooling, lubrication), and a part of the hydraulic pressure generated at the first hydraulic pump is pressurized to a higher pressure at the second hydraulic pump to be supplied to high pressure portions (such as hydraulic pressure for operating friction members for shifting).

In such a scheme, the low pressure portion forms an overall hydraulic pressure of the transmission, and only a part of the hydraulic pressure is pressurized to the high pressure required for high pressure portions.

According to such a scheme, power consumption for driving the hydraulic pump may be reduced, thereby achieving improvement of fuel consumption, and in addition, reduction of noise and vibration may be achieved by decreasing a load applied to the hydraulic pump, thereby providing an improved durability.

The above information disclosed in this Background section is only for enhancement of understanding of the background of the present disclosure and therefore it may contain information that does not form the prior art that is already known to a person of ordinary skill in the art.

SUMMARY

In one form of the present disclosure, a hydraulic pressure supply system of an automatic transmission for a vehicle includes: a first hydraulic pump configured to form a first hydraulic pressure from a hydraulic fluid stored in an oil pan; a second hydraulic pump configured to pressurize a received hydraulic pressure to a higher pressure, the received hydraulic pressure being receivable from the first hydraulic pump and from the oil pan; a regulator valve disposed at an upstream side of a low pressure portion requiring a low hydraulic pressure, and configured to regulate hydraulic pressures supplied from the first hydraulic pump and the second hydraulic pump, thereby to supply the regulated hydraulic pressure to the low pressure portion; and a plurality of hydraulic lines configured to supply the hydraulic pressure generated at the first hydraulic pump to the regulator valve and a high pressure portion and configured to supply the hydraulic pressure generated at the second hydraulic pump to the high pressure portion and the regulator valve.

In one form, the plurality of hydraulic lines may include: a first hydraulic line connecting the oil pan and the first hydraulic pump, a second hydraulic line connecting the first hydraulic pump and the regulator valve, a third hydraulic line connecting the regulator valve and the low pressure portion, a fourth hydraulic line connecting the second hydraulic line and the second hydraulic pump, a fifth hydraulic line connecting the second hydraulic pump, the high pressure portion, and the regulator valve, a sixth hydraulic line connecting the fourth hydraulic line and the fifth hydraulic line, and a seventh hydraulic line connecting the first hydraulic line and the fourth hydraulic line.

In another form, a first one-way valve may be disposed on the second hydraulic line at a position after branching of the fourth hydraulic line. A second one-way valve may be disposed at an upstream side of the fifth hydraulic line. A third one-way valve may be disposed on the seventh hydraulic line. A check valve may be disposes on the sixth hydraulic line.

In other form, the first hydraulic pump may be a mechanical hydraulic pump driven by an engine. The second hydraulic pump may be an electrical hydraulic pump driven by a motor.

The regulator valve may be controlled by a pressure difference between a control pressure of a solenoid valve and an elastic force of an elastic member, and the hydraulic pressure supplied from the fifth hydraulic line connecting the second hydraulic pump to the regulator valve.

According to a hydraulic pressure control system according to an exemplary form, the second hydraulic pump 6 may further pressurize a part of the hydraulic pressure supplied from the first hydraulic pump 2 to a higher pressure and supply the high pressure to required parts. Therefore, power loss by an employed hydraulic pump may be reduced, durability is improved, and noise and vibration due to the hydraulic pump may be decreased.

In addition, according to a hydraulic pressure control system according to an exemplary form, in a driving condition where the engine is stopped or operated at a very low speed, although the first hydraulic pump is also stopped or may generate insufficient hydraulic pressure, the second hydraulic pump 6 may be used as a main source of hydraulic pressure supplied to the high and low pressure portions. Therefore, the exemplary hydraulic pressure control system may be applied various types of vehicles including an idle-stop-and-go (ISG) vehicle.

Furthermore, according to a hydraulic pressure control system according to an exemplary form, in a driving condition where the first hydraulic pump may generate sufficiently large amount of pressurized fluid, the second hydraulic pump may be stopped to reduce power loss, or may be reversely driven to regenerate electricity by the hydraulic pressure generated by the first hydraulic pump.

Other effects that may be obtained or are predicted by an exemplary form will be explicitly or implicitly described in a detailed description of the present disclosure. That is, various effects that are predicted according to an exemplary form will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
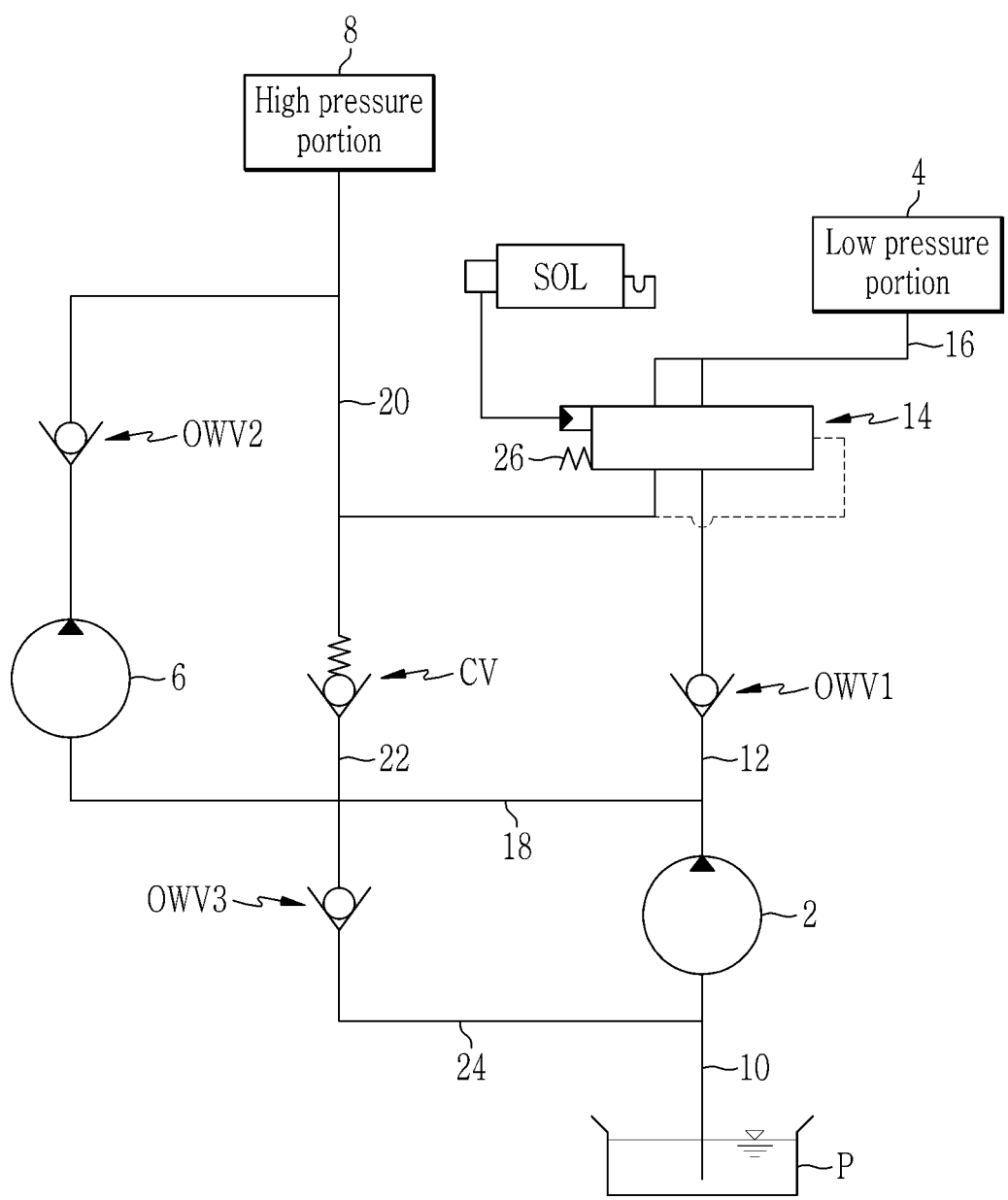
FIG. 1 is a schematic view of a hydraulic pressure supply system according to an exemplary form.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a hydraulic pressure supply system according to an exemplary form of the present disclosure.

Referring to FIG. 1, according to the hydraulic pressure supply system, a low hydraulic pressure generated at a first hydraulic pump 2 of a large capacity is supplied to a low pressure portion 4 such as a torque converter, a cooling portion, a lubrication portion and the like, and a high hydraulic pressure generated at a second hydraulic pump 6 of a small capacity is supplied to a high pressure portion 8 such as a friction member operated for a shifting, a portion driving pulley of a CVT, and the like.

Here, the low hydraulic pressure means a relatively low pressure required for an operation of a torque converter, cooling and lubrication of a transmission, or the like. The high hydraulic pressure means a relatively high pressure appropriate for a high load such as operating a friction member for shifting operation of a transmission, operating drive and driven pulleys of a CVG, or the like.

The first hydraulic pump 2 may be formed as a known mechanical pump driven by an engine torque. The first hydraulic pump 2 is connected to an oil pan P through a first hydraulic line 10, and the low hydraulic pressure generated by the first hydraulic pump 2 is discharged to a second hydraulic line 12.

The second hydraulic line 12 is connected to a regulator valve 14. The low hydraulic pressure supplied to the regulator valve 14 through the second hydraulic line 12 is stably controlled by the regulator valve 14, and then supplied to a low pressure portion 4 through a third hydraulic line 16.

The second hydraulic pump 6 may be formed as an electrical pump driven by a motor. The second hydraulic pump 6 pressurizes the low hydraulic pressure received through a fourth hydraulic line 18 branched from the second hydraulic line 12, and discharges the pressurized high pressure to a fifth hydraulic line 20.

The hydraulic pressure discharged from the second hydraulic pump 6 to the fifth hydraulic line 20 is supplied to a high pressure portion 8, and at the same time, is stably controlled at the regulator valve 14 to be supplied to the low pressure portion 4.

The fourth hydraulic line 18 is connected to the fifth hydraulic line 20 through a sixth hydraulic line 22, and also connected to the first hydraulic line 10 through a seventh hydraulic line 24.

First, second, and third one-way valves OWV1, OWV2, and OWV3 are respectively disposed on the second hydraulic line 12, the fifth hydraulic line 20, and the seventh hydraulic line 24. The first one-way valve OWV1 is disposed at a downstream side of the second hydraulic line 12, i.e., after branching of the fourth hydraulic line 18, such that the hydraulic pressure supplied to the regulator valve 14 may be prevented from flowing back through the second hydraulic line 12 to the fourth hydraulic line 18. The second one-way valve OWV2 is disposed at an upstream side of the fifth hydraulic line 20, such that the hydraulic pressure supplied to the high pressure portion 8 is prevented from flowing back to the second hydraulic pump 6. The third one-way valve OWV3 prevents the hydraulic pressure supplied to the fourth hydraulic line 18 from flowing back to the first hydraulic line 10.

In addition, a check valve CV is disposes on the sixth hydraulic line 22 connecting the fourth hydraulic line 18 and the fifth hydraulic line 20. The check valve CV prevents a hydraulic pressure from flowing back from the fifth hydraulic line 20 to the fourth hydraulic line 18. The check valve CV is configured to be open when the hydraulic pressure of the fourth hydraulic line 18 is above the hydraulic pressure of the fifth hydraulic line 20 by a predetermined value 9.

The regulator valve 14 is configured to selectively supply the low hydraulic pressure supplied from the first hydraulic pump 2 and the high hydraulic pressure supplied from the second hydraulic pump 6 to the low pressure portion 4, and to simultaneously supply the low hydraulic pressure supplied from the first hydraulic pump 2 and the high hydraulic pressure supplied from the second hydraulic pump 6 to the low pressure portion 4.

For this purpose, the regulator valve 14 may be formed as a conventional spool valve. The regulator valve 14 is controlled by a pressure difference between, at one side, a control pressure under a proportional control of a solenoid valve SOL and an elastic force of an elastic member 26, and at an opposite side, the hydraulic pressure supplied from the fifth hydraulic line 20.

Figure 2:
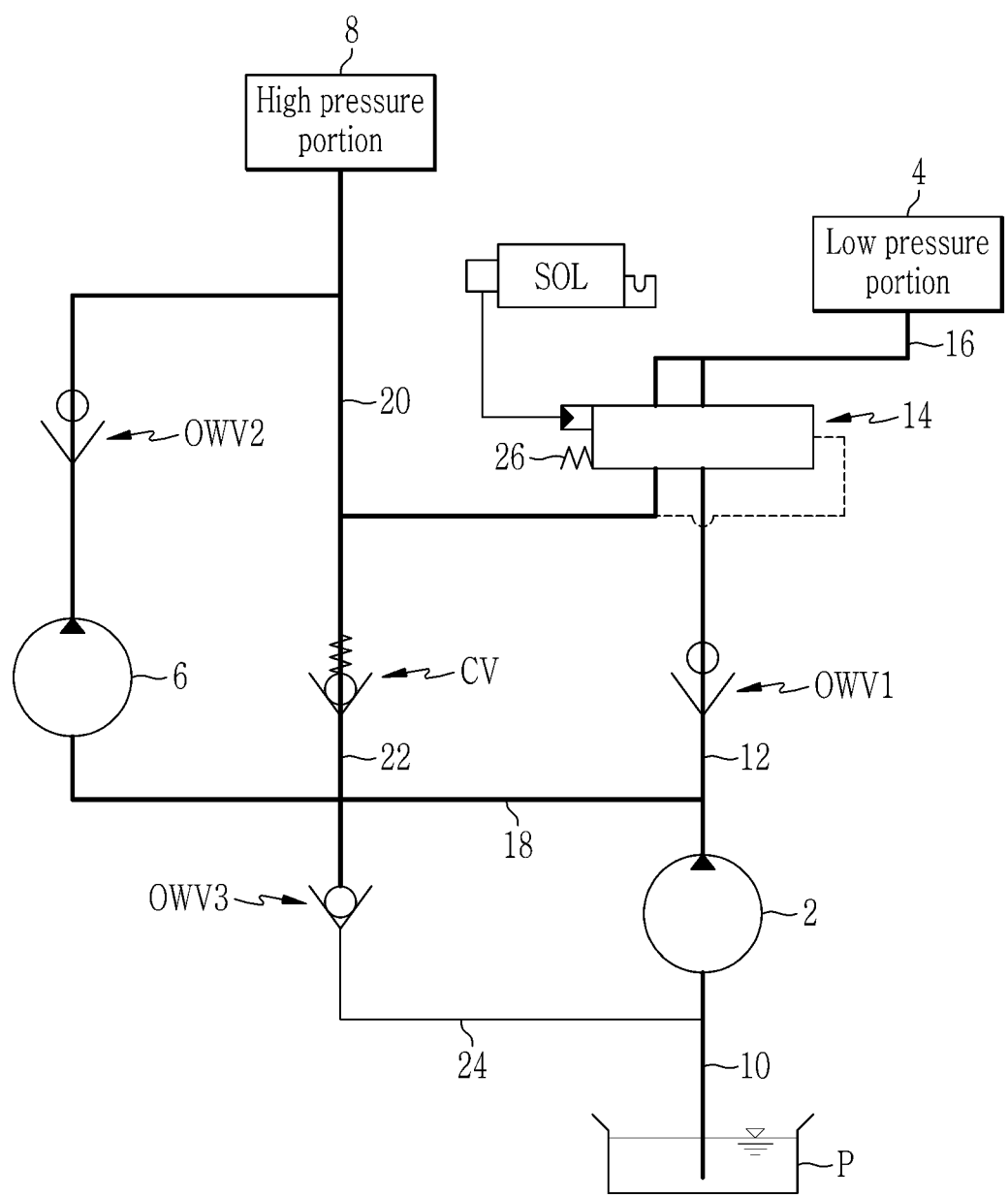
FIG. 2 is a schematic view of a hydraulic pressure supply system according to an exemplary form, and illustrates a hydraulic pressure flow when first and second hydraulic pumps are simultaneously operated.

FIG. 2 is a schematic view of a hydraulic pressure supply system according to an exemplary form of the present disclosure, and illustrates a hydraulic pressure flow when first and second hydraulic pumps are operated.

Referring to FIG. 2, since an engine (not shown) is running in a normal driving state, the first hydraulic pump 2 is driven by the engine torque of the engine, and the second hydraulic pump 4 is driven by a motor torque of a motor (not shown) under the control of a transmission control unit (not shown).

Accordingly, a part of the hydraulic pressure generated at the first hydraulic pump 2 is supplied to the low pressure portion 4 consecutively through the second hydraulic line 12 passing through the first one-way valve OWV1, the regulator valve 14, and the third hydraulic line 16.

In addition, a part of the hydraulic pressure generated at the first hydraulic pump 2 is supplied to the high pressure portion 8 consecutively through the fourth hydraulic line 18, the second hydraulic pump 6, and the fifth hydraulic line 20 passing through the second one-way valve OWC2.

It may be understood that, although the hydraulic pressure supplied to the fifth hydraulic line 20 is higher than the hydraulic pressure of the fourth hydraulic line 18, the check valve CV prevents the hydraulic pressure of the fifth hydraulic line 20 from flowing to the fourth hydraulic line 18.

Figure 3:
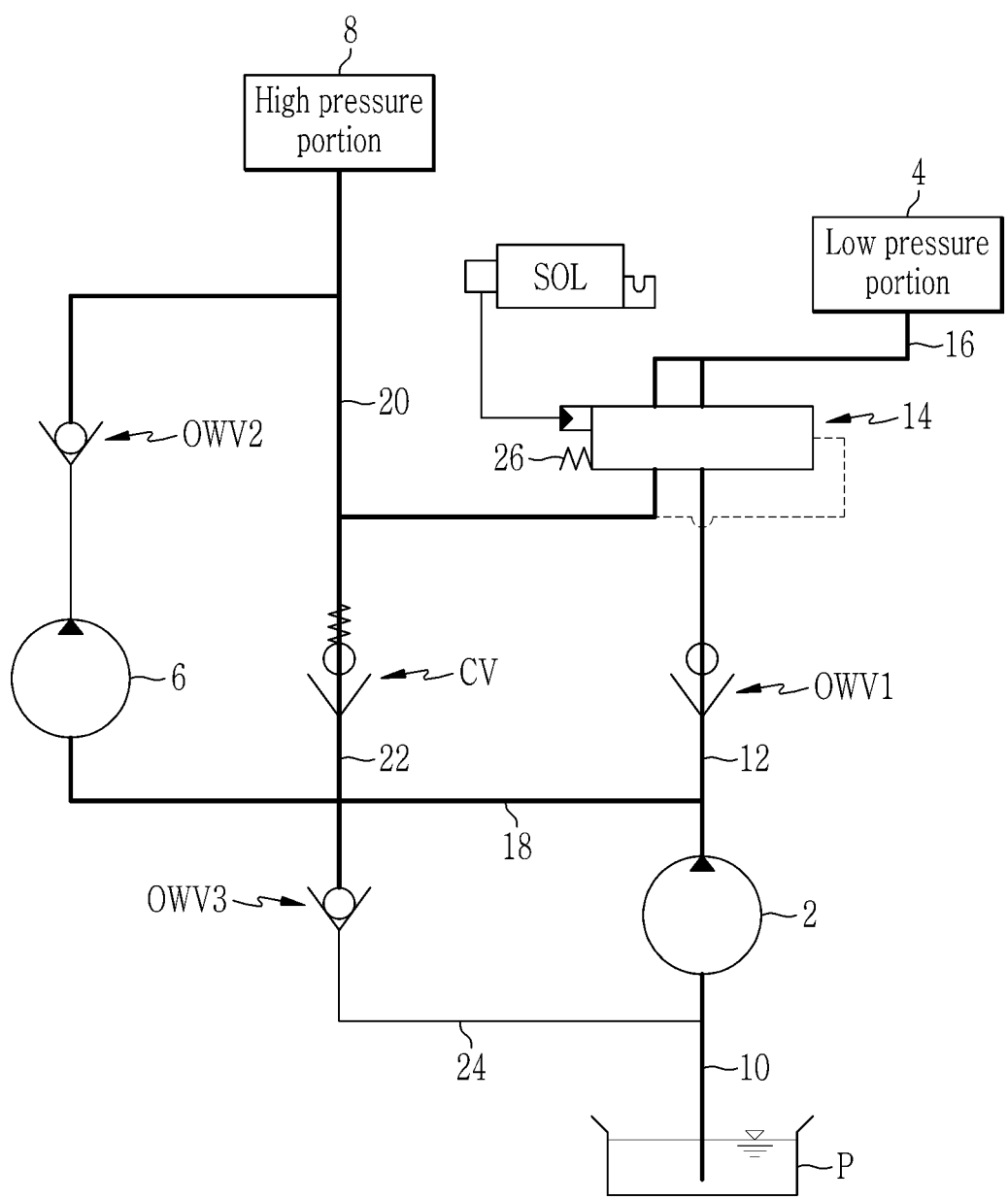
FIG. 3 is a schematic view of a hydraulic pressure supply system according to an exemplary form, and illustrates a hydraulic pressure flow when a first hydraulic pump is operated.

FIG. 3 is a schematic view of a hydraulic pressure supply system according to an exemplary form of the present disclosure, and illustrates a hydraulic pressure flow when a first hydraulic pump is operated.

Referring to FIG. 3, in a driving condition where the first hydraulic pump 2 discharges a large amount of fluid, e.g., running the engine at a high rpm, only the first hydraulic pump 2 may be operated. When the first hydraulic pump 2 is operated, a part of the hydraulic pressure generated at the first hydraulic pump 2 is supplied to the low pressure portion 4 consecutively through the second hydraulic line 12 passing through the first one-way valve OWV1, the regulator valve 14, and the third hydraulic line 16.

The hydraulic pressure generated at the first hydraulic pump 2 is also supplied to the high pressure portion 8, consecutively through the fourth hydraulic line 18, the sixth hydraulic line 22 passing through the check valve CV, and the fifth hydraulic line 20.

At this time, the hydraulic pressure supplied to the fifth hydraulic line 20 is prevented from flowing back to the second hydraulic pump 6, by the second one-way valve OEV2.

Therefore, it may be understood that, in this case, the second hydraulic pump 6 may be reversely driven by the hydraulic pressure of the fifth hydraulic line 20, and therefore, the motor connected to the second hydraulic pump 6 may regenerate electricity.

Figure 4:
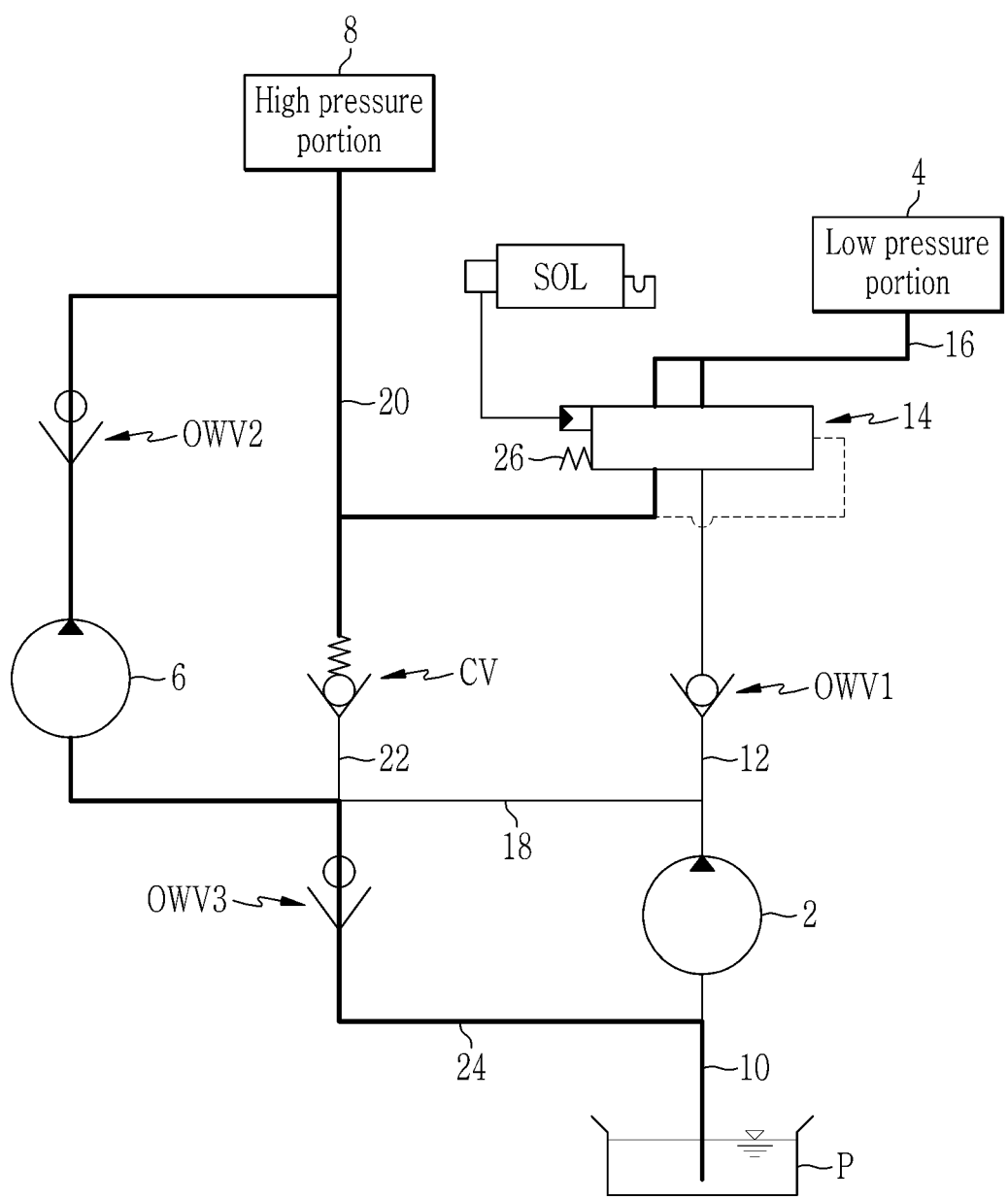
FIG. 4 is a schematic view of a hydraulic pressure supply system according to an exemplary form, and illustrates a hydraulic pressure flow when a second hydraulic pump is operated.

FIG. 4 is a schematic view of a hydraulic pressure supply system according to an exemplary form of the present disclosure, and illustrates a hydraulic pressure flow when a second hydraulic pump is operated.

Referring to FIG. 4, in the case of an idle stop or coasting with the engine stopped, the engine is not running and therefore, the operation of the first hydraulic pump 4 stops and only the second hydraulic pump 6 is operated.

Then the fluid stored in the oil pan P is drawn to the second hydraulic pump 6 through the seventh hydraulic line 24 passing through the third one-way valve OWV3 and the fourth hydraulic line 18. The hydraulic pressure generated at the second hydraulic pump 6 is supplied to the high pressure portion 8 through the fifth hydraulic line 20, and at the same time, is also supplied to the low pressure portion 4 through the regulator valve 14.

It may be understood that, it the case of driving condition where the first hydraulic pump 2 does not generate a sufficient hydraulic pressure, e.g., at driving a vehicle with the engine at a low rpm (e.g., at idling rpm), the second hydraulic pump 6 may be operated as a main source of the hydraulic pressure, and the low pressure part 4 may be mainly supplied with hydraulic pressure from the second hydraulic pump 6.

As described above, according to a hydraulic pressure control system according to an exemplary form, the second hydraulic pump 6 may further pressurize a part of the hydraulic pressure supplied from the first hydraulic pump 2 to a higher pressure and supply the high pressure to required parts. Therefore, power loss by an employed hydraulic pump may be reduced, durability is improved, and noise and vibration due to the hydraulic pump may be decreased.

In addition, according to a hydraulic pressure control system according to an exemplary form, in a driving condition where the engine is stopped or operated at a very low speed, although the first hydraulic pump is also stopped or may generate insufficient hydraulic pressure, the second hydraulic pump 6 may be used as a main source of hydraulic pressure supplied to the high and low pressure portions. Therefore, the exemplary hydraulic pressure control system may be applied various types of vehicles including an idle-stop-and-go (ISG) vehicle.

Furthermore, according to a hydraulic pressure control system according to an exemplary form, in a driving condition where the first hydraulic pump may generate sufficiently large amount of pressurized fluid, the second hydraulic pump may be stopped to reduce power loss, or may be reversely driven to regenerate electricity by the hydraulic pressure generated by the first hydraulic pump.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

DESCRIPTION OF SYMBOLS

2: first hydraulic pump
4: low pressure portion
6: second hydraulic pump
8: high pressure portion
10, 12, 16, 18, 20, 22, 24: first, second, third, fourth, fifth, sixth, and seventh hydraulic lines
14: regulator valve
CV: check valve
OWV1, OWV2, OWV3: first, second, and third one-way valves
SOL: solenoid valve

What is claimed is:

1. A hydraulic pressure supply system of an automatic transmission for a vehicle, the hydraulic pressure supply system comprising:

a first hydraulic pump configured to form a first hydraulic pressure from a hydraulic fluid stored in an oil pan;

a second hydraulic pump configured to pressurize a received hydraulic pressure to a higher pressure, the received hydraulic pressure being receivable from the first hydraulic pump and from the oil pan;

a regulator valve disposed at an upstream side of a low pressure portion requiring a low hydraulic pressure, and configured to regulate hydraulic pressures supplied from the first hydraulic pump and the second hydraulic pump, thereby to supply the regulated hydraulic pressure to the low pressure portion; and a plurality of hydraulic lines configured to supply the hydraulic pressure generated at the first hydraulic pump to the regulator valve and a high pressure portion and configured to supply the hydraulic pressure generated at the second hydraulic pump to the high pressure portion and the regulator valve, wherein the plurality of hydraulic lines comprises:

a first hydraulic line connecting the oil pan and the first hydraulic pump;

a second hydraulic line connecting the first hydraulic pump and the regulator valve;

a third hydraulic line connecting the regulator valve and the low pressure portion;

a fourth hydraulic line connecting the second hydraulic line and the second hydraulic pump;

a fifth hydraulic line connecting the second hydraulic pump, the high pressure portion, and the regulator valve;

a sixth hydraulic line connecting the fourth hydraulic line and the fifth hydraulic line; and a seventh hydraulic line connecting the first hydraulic line and the fourth hydraulic line, and wherein:

a first one-way valve is disposed on the second hydraulic line at a position after branching of the fourth hydraulic line, a second one-way valve is disposed at an upstream side of the fifth hydraulic line, a third one-way valve is disposed on the seventh hydraulic line, and a check valve is disposes on the sixth hydraulic line.

2. The hydraulic pressure supply system of claim 1, wherein:

the first hydraulic pump is a mechanical hydraulic pump driven by an engine; and the second hydraulic pump is an electrical hydraulic pump driven by a motor.

3. The hydraulic pressure supply system of claim 1, wherein the regulator valve is controlled by a pressure difference between a control pressure of a solenoid valve and an elastic force of an elastic member, and a hydraulic pressure supplied from a hydraulic line connecting the second hydraulic pump to the regulator valve.

* * * * *